United States Patent Office 3,827,955
Patented Aug. 6, 1974

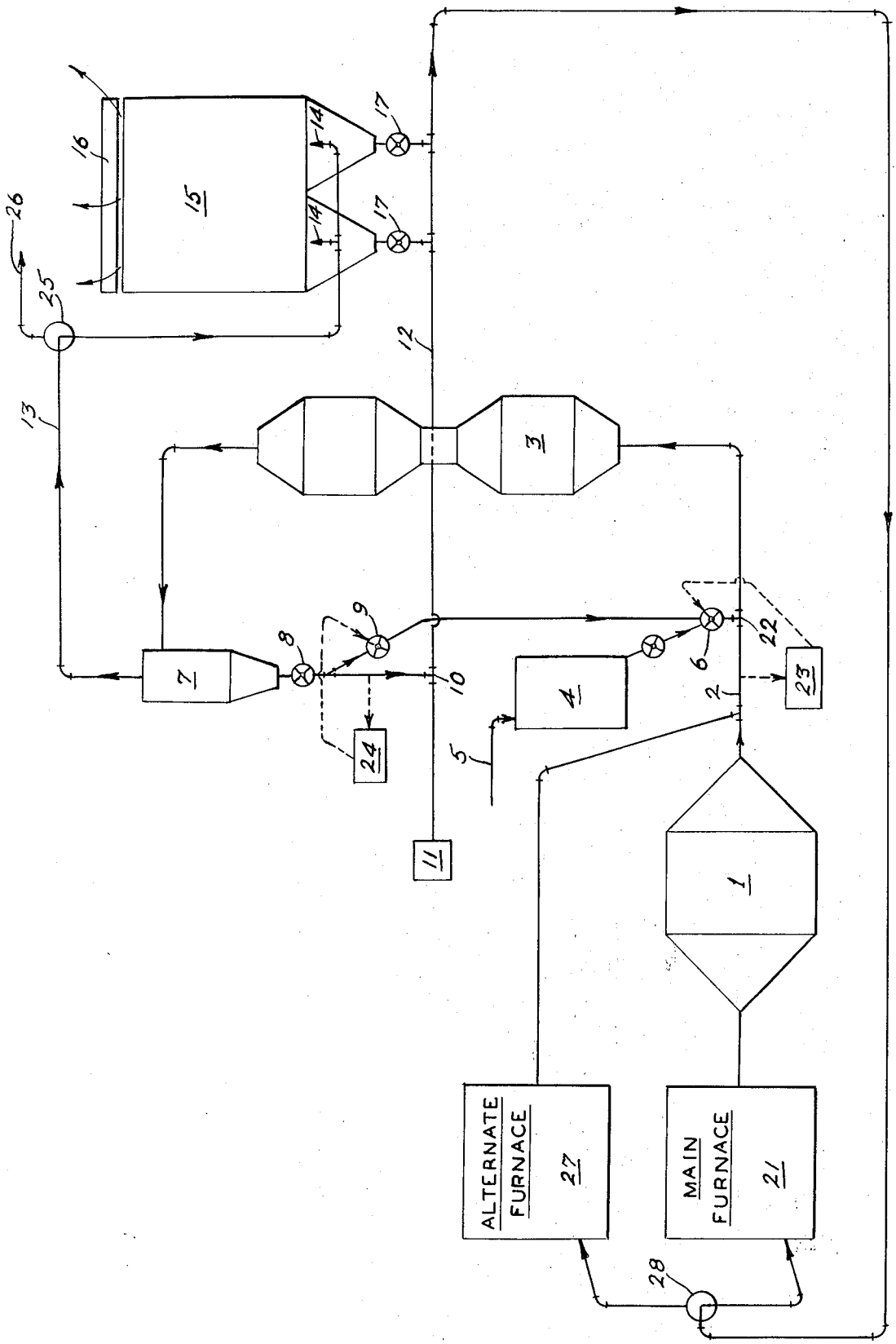

3,827,955
CLEANING WASTE GASES CONTAINING HYDROGEN FLUORIDES FROM AN ELECTROLYTIC FURNACE FOR ALUMINUM PRODUCTION
Marcel Bahri, Duvnas, and Kurt Carlsson, Vaxjo, Sweden, assignors to AB Svenska Flaktfabriken, Nacka, Sweden
Filed Sept. 29, 1972, Ser. No. 293,496
Claims priority, application Sweden, Oct. 27, 1971, 13,676/71
Int. Cl. C22d 3/12, 3/02
U.S. Cl. 204—67         6 Claims

ABSTRACT OF THE DISCLOSURE

Alumina is injected into the waste gases in an amount controlled according to the concentration of hydrogen fluoride therein. The gases are caused to flow turbulently through a reactor and then through separators so that the alumina (and adsorbed hydrogen fluoride) may be directed into the furnaces and the cleansed gases may be discharged.

---

This invention relates to a novel and improved method for cleaning waste gases containing hydrogen fluorides from an electrolytic furnace for the production of aluminum, in which method particulate $Al_2O_3$ (alumina) is injected into the waste gases for the adsorption of HF (hydrogen fluoride).

At primary aluminum smelteries at present both wet and dry methods are applied for the separation of particulate and gaseous impurities, which substantially consist of hydrogen fluorides. In the dry method, which in the future can be assumed to be the most attractive solution, conventional methods are applied, in which aluminum oxide is injected into the duct system in advance of the filter used in the process, which filter usually is a bag filter. The disadvantages of conventional methods are among others, heavy wear of the filter parts of low-load filters and a general wear of the felt material of high-load filters resulting in relatively high maintenance costs. Lately a highly effective method was developed, in which the waste gases were passed through a fluidized bed of aluminum oxide and thereafter filtered through a bag filter disposed above the bed.

The object of the present invention is to bring about the same effectiveness of the aforedescribed method, but by way of another solution, which would be economically superior to said method both in space saving and in operation and maintenance.

The method according to the invention is characterized in that the mixture of waste gases and alumina, after possibly having passed through a preliminary filter of a kind known per se, for example an electrostatic precipitator, is caused to react in a primary phase in a reactor in that fluorides are adsorbed on the alumina particles, and that the reaction is accelerated in that the mixture is caused to move in a turbulent way in one or several sections of its flow path, whereafter the alumina particles are separated mechanically from the gas mass substantially freed from fluorine, and the gas thereafter is discharged to the atmosphere, possibly to an extra precipitator while the alumina particles influenced by the fluorides are returned to the furnace.

According to a preferred embodiment of this method, the gas after it has been cleaned to the greatest extent, and after the mechanical separation of the alumina particles, is caused to pass through a bag filter where the remaining part of gaseous fluorides in a secondary phase are adsorbed on a controlled amount of unconsumed alumina particles, whereafter the gas thus cleaned additionally is discharged to the atmosphere while the alumina particles are separated at the bottom of the bag filter and returned to the furnace.

According to this preferred embodiment of the method, the turbulent flow of the mixture of waste gases and alumina is brought about in such a way that the mixture is subjected to acceleration and retardation alternately while being passed through successive sections of the reactor.

According to a feature of the method according to the invention, said acceleration and retardation is such that the flow rate of the mixture through the respective reactor sections is caused to vary between about 5.0 m./s. and about 0.8 m./s., and the residence time in the reactor for obtaining a satisfactory adsorption is chosen to have a value of the magnitude 6 seconds.

The invention is described in greater detail in the following description, with reference to the accompanying schematic drawing, in which:

The figure shows schematically the method and apparatus for the cleaning of waste gases discharged from an aluminum main furnace in which so-called Soderberg electrodes are applied and an alternate furnace in which so-called "prebaked" electrodes are utilized.

In the Soderberg process the crude gases discharged from the furnace 21 contain a large percentage of tar, 10 to 100 mg./Nm.$^3$, which advantageously can be separated in an electrostatic precipitator, as shown at 1 in the drawing. In view of the tar consistency, preferably a pelletizer is to be applied which converts the dust, prior to dumping or use, to pellets. In the electrostatic precipitator also dust and iron are separated from the gases. The gases from the electrostatic precipitator which contain a small percentage of tar, particulate fluorides and gaseous fluorides thereafter pass through a duct system 2, in which with a certain dosage a quantity of alumina is injected at 22. The quantity injected at 22 is controlled to insure entrainment of the alumina in the gas stream in a proper quantity to obtain the optimum relation of the alumina to the concentration of fluorides in the gases. To obtain proper injection, a metering device may be provided at 6 and a sampling and analyzing device 23 may be incorporated in the duct system 2 in advance of the injection point 22 so as to afford accurate control of the feeder 6.

The aluminum oxide then reacts with the gaseous fluorides in a reactor 3 of the design described below. The gases pass upwards from below and depending on the amount of aluminum oxide in relation to the fluoride content in the gas, temperature, fluoride concentration and residence time, an adsorption of the gas fluorides in the reactor and in the cyclone connected after the reactor at 7 in the drawing takes place whereby efficiency becomes of the magnitude up to 97%, for example at 50% alumina consumption.

The gases and the reactions products, as shown, thereafter pass through a cyclone separator 7, in which 95–97% of the carried dust is separated. After having left the cyclone, the gases pass through a duct system 13 to a bag filter 15. The degree of separation in the cyclone is chosen such that an amount of alumina controlled in advance is carried with the gases to the bag filter where a secondary reaction is effected between the gas fluorides and aluminum oxide. The dust discharged from the cyclone 7 through the feeder 8 may partially be recirculated through the reactor, for example by a sluice 9 to the injection point 22, and the remaining part may be injected at 10, and together with the dust obtained from the bag filter, may be transported back to the aluminum furnaces pneumatically by a blower 11 and conveyor 12 or by some other known method. The dust from the cyclone may also in its entirety be transported away to the furnaces, depending on the effective utilization of the alumina. A sampling device or analyzer may be provided at 24 to control the proportion of recycled alumina withdrawn by the sluice 9.

The bag filter 15 may be either of so-called low-load or of high-load type. When using low-load filters, the vibration intervals (cleaning cycle) are to be optimized in order thereby to obtain the highest reaction degree. The total gas fluoride adsorption in this method, i.e. by means of reactor, cyclone and bag filter, was measured in an actual case to be 99–99.8% at 50% alumina consumption. The real mechanism for the adsorption of the gaseous impurities is not yet fully known because a conversion to the aluminum fluoride cannot be expected at these low temperatures. It is, thus, presupposed that the gas fluorides, which substantially contain hydrogen fluoride only influence the alumina surface layer, which in its turn is converted to aluminum fluoride without being split off from the surface and with no crystal change.

The electrostatic precipitator separates substantially particulate impurities, i.e. tar and dust with fluoride components and iron. Alumina is injected into the duct 2 through a metering device. Alumina is presupposed to be stored in a silo 4, which is filled with aluminum oxide by pneumatic transport, designated by 5, from a large central silo. In the embodiment shown, the reactor 3 is provided with a vertical pipe having different sections with different cross-sectional areas. The reactor may comprise more sections than the two shown in the drawing. In a practical operation case, the gas rate at the narrowest reactor section was about 5 m./s., and at the widest section the gas rate measured was about 0.8 m./s. The height of each section was adjusted to the gas rate, and the residence time in the experimental plant was 6 to 7 seconds (volume divided by the gas amount per second). Following the reactor 3, the gases together with the aluminum oxide which has been diluted with hydrogen fluoride gas, pass through the cyclone separator 7 constructed for a definite degree of separation, in which separator 95–97% of the dust is to be separated. The amount of aluminum oxide, which according to above is injected at the point 22, is mixed with oxide having been diluted with hydrogen fluoride gas in the reactor. The amount of aluminum fluoride recirculated is controlled by the device 9 acting as a variator as set forth above. The oxide from the cyclone 7 as mentioned above, may be transported away in its entirety to the aluminum furnaces by the duct system 12.

The aluminum oxide, is evacuated from the bag filters 15 through the sluice apparatus 17 and in the direction of the arrow is to be supplied to the aluminum furnace 21. In the schematic drawing shown, the bag filter was assumed to be a so-called low-load filter, into which the gases are introduced through funnels 14, thereafter filtered through the bags and finally as cleaned gases evacuated to the atmosphere through a skylight designated by 16. The bag filter preferably comprises several chambers equipped with automatic vibration means. The vibration intervals are determined by a suitable reaction time between aluminum oxide and hydrogen fluoride. In a test installation the optimum difference in time between the vibrations was of the magnitude 2 to 3 hours. The gas load on the bag filter was between 36 and 44 $m.^3/h./m.^2$ cloth surface.

The invention has been described with reference to low-load filters, but also so-called high-load filters may be used where the cleaning is carried out with compressed air. A suitable load in such a case would be of the magnitude 80 to 100 $m.^3/h./m.^2$. Also other modifications can be imagined. By an improved adsorption in the reactor with, for example increased turbulence, or by mounting an insert in the reactor, the present hydrogen fluoride adsorption may be improved still more and thereby possibly eliminate the bag filter and the secondary reaction therein. To this end, a valve 25 is provided in the duct 13, so that the gases from the separator 7 may be discharged directly to the atmosphere as indicated at 26.

An alternate furnace may be provided at 27. In this case the furnace 27 utilized "prebaked" electrodes, eliminating the need for a preliminary electrofilter such as shown at 1. A diverter is provided at 28 to direct the used alumina to either furnace 21 or 28. At the same time, it would be possible to replace the above-described bag filter by filters of so-called high-load type. Also other modifications of the design of the installation are imaginable within the scope of the claims filed.

We claim:

1. A method for cleaning waste gases containing hydrogen fluorides exhausted from an electrolytic furnace for producing aluminum, comprising the steps of providing in closed path for the exhausted gases from the furnace to the atmospheric discharge, injecting particulate alumina into the exhausted gases in said path adjacent the furnace for the adsorption of hydrogen fluoride, determining the concentration of hydrogen fluoride in the exhausted gases, controlling the quantity of alumina injected into the gases to insure entrainment of the alumina into the gas stream and optimum relation of the alumina to the concentration of fluorides in the gases, directing the gas stream with the alumina entrained therein into a reactor, accelerating the adsorption of the hydrogen fluoride by the alumina in the reactor by causing the gas stream to flow turbulently through the reactor in at least one part of its flow path, dividing said reactor into a plurality of sections arranged in succession along said part of the flow path and effecting said turbulent flow by alternately accelerating and decelerating the gas stream as it flows through said succession sections, maintaining the flow path through the reactor of a sufficient length to insure sufficient residence time in the reactor to substantially eliminate the free hydrogen fluoride from the gas stream, conveying said stream with the entrained particulate alumina in said path to a primary separator, centrifugally separating the heavier particles of the particulate alumina and the adsorbed hydrogen fluoride from the gas stream in said primary separator and directing at least a portion of said separated alumina to the electrolytic furnace, and discharging the cleansed gas after said separation.

2. A method according to Claim 1 wherein said separation of the particulate alumina is effected in two stages, the said primary stage being centrifugal cyclonic separation and a secondary stage being bag filtration, including the step of regulating the quantity of the aluminum particles filtered by said bag filtration to provide further adsorption of any hydrogen fluoride remaining in said exhaust stream.

3. A method according to Claim 1 wherein the flow acceleration and deceleration provides flow velocities therein alternating between five meters per second and 0.8 meters per second and a residence time in the reactor of six seconds.

4. A method for cleaning waste gases from an aluminum furnace having Soderberg electrodes according to Claim 1 including the preliminary step of passing said gases through an electrofilter prior to the injection of particulate alumina into the gas stream.

5. A method according to Claim 4 wherein said particulate alumina with adsorbed hydrogen fluoride is centrifugally separated from the gas stream cyclonically, a selected portion of the separated alumina being reintroduced into the gas stream and a portion being returned to the furnace.

6. A method according to Claim 5 including the step of determining the amount of adsorbed hydrogen fluoride in the centrifugally separated alumina and controlling the selected portion inversely in accordance with the amount of adsorbed hydrogen fluoride.

References Cited

UNITED STATES PATENTS

| | | | |
|---|---|---|---|
| 3,760,565 | 9/1973 | Fish | 204—67 X |
| 3,780,497 | 12/1973 | Muhlrad | 55—71 |
| 3,503,184 | 3/1970 | Knapp et al. | 55—71 |
| 3,470,075 | 9/1969 | Johnson | 204—247 X |
| 3,664,935 | 5/1972 | Johnson | 204—67 |
| 2,919,174 | 12/1959 | Pring | 204—67 X |
| 2,943,914 | 7/1960 | Moser | 204—67 X |
| 3,006,825 | 10/1961 | Sem | 204—67 |

FOREIGN PATENTS

| | | | |
|---|---|---|---|
| 613,352 | 1/1961 | Canada | 204—67 |
| 582,780 | 9/1959 | Canada | 204—67 |

JOHN H. MACK, Primary Examiner

D. R. VALENTINE, Assistant Examiner

U.S. Cl. X.R.

55—71; 204—247